April 19, 1966  S. B. HAN ETAL  3,247,325
CIRCUIT ARRANGEMENT FOR TESTING LINES IN COMMUNICATION SYSTEMS
Filed Aug. 21, 1962
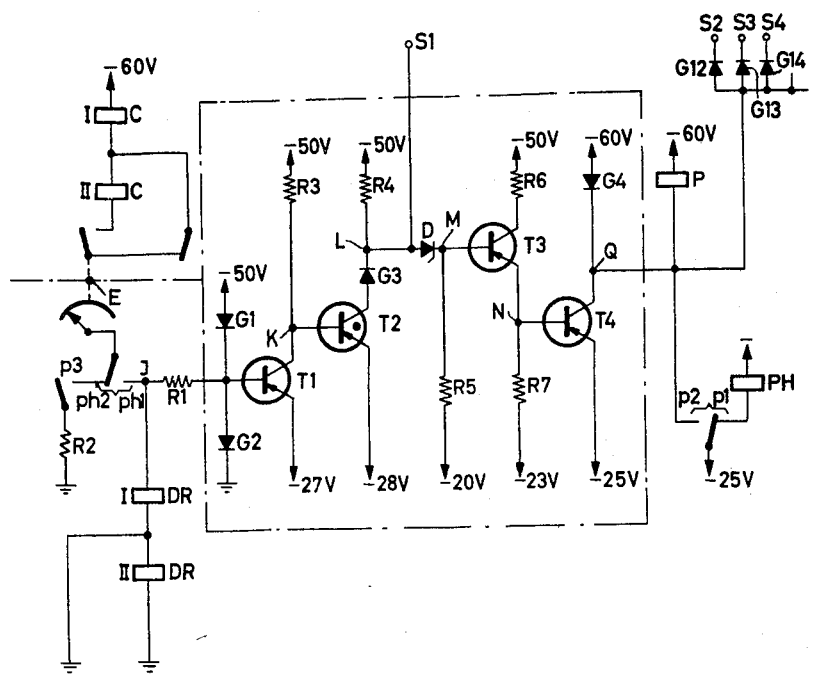

United States Patent Office 3,247,325
Patented Apr. 19, 1966

3,247,325
CIRCUIT ARRANGEMENT FOR TESTING LINES IN COMMUNICATION SYSTEMS
Swan Bing Han, Munich-Solln, and Friedrich Licht, Munich, Germany, assignors to Siemens & Halske Aktiengesellschaft, Berlin and Munich, Germany, a corporation of Germany
Filed Aug. 21, 1962, Ser. No. 218,291
Claims priority, application Germany, Sept. 22, 1961, S 75.885
4 Claims. (Cl. 179—18)

The invention disclosed herein relates to the testing of of lines in communication systems, especially telephone systems, and is particularly concerned with a circuit arrangement for testing the operating condition, whether busy or idle, of lines containing complex resistances, and for busying such a line upon ascertaining that it is idle.

A problem which arises in connection with centrally controlled communication systems has to do with operatively connecting for the shortest possible time intervals centrally disposed control devices which are common to a plurality of individual connection devices employed for extending connection. Such centrally disposed control devices frequently also have the function of checking the occupied condition of connection devices for example, selectors or selection transmission or selection repeating devices, over test lines. Thus the duration of connection of such central switching devices can be reduced by reducing the time required in the testing and occupation operations.

The operating condition of connection devices is, with the use of known control devices, ascertained with the aid of test relays. The operatively effective energizing time of such relays corresponding to the current increase, is determined by the inductivity of the seizure or private relays contained in the respective connection devices which are being tested.

Electronic testing circuits are known for reducing the testing interval, such circuits testing for the presence of high resistance. The operating switching time of such circuits does not depend upon the inductivity of the seizure or private relays contained in the connection devices which are being tested; however, such circuits effect the busying of a given tested line or private conductor, only after a definite testing result is established.

A testing circuit has also been proposed, employing a parallel circuit of a purely ohmic resistor and a high resistance electronic voltage measuring circuit, which cooperate for initiating the testing operation and the busying of a given tested line. The voltage drop at the resistor, which is decisive for the testing, is however dependent upon the current flowing in the line which is being tested, the increase of the current being determined by the inductivity of the respective seizure or private relay. This dependence affects the time factor and delays the testing operation.

The object of the invention is to make the testing operation independent of the inductivity of the seizure or private relay in a line which is being tested, thereby accelerating the testing operation, while retaining the initiation of the testing operation simultaneously with the busying of the respective line which is being tested.

This object is realized by supplementing the complex resistance of a test line to form a voltage divider, by connecting thereto a test circuit having a resistance which produces, during the current increase in the line, at the voltage divider center point, a voltage potential as a test potential which remains constant with respect to the voltage source.

The result of this measure is, that the voltage drop, at the complex resistance of the test circuit, which is preferably formed by a simulation of the complex resistance of the test line and a high resistance voltage measuring circuit connected parallel thereto, appears directly after the switching-through of the test circuit and becomes effective in the high resistance test circuit.

Details of the invention will now be described with reference to the accompanying drawing showing only the circuits of an embodiment thereof which are required for an understanding of the invention.

The invention may be utilized, for example, in an arrangement of the type illustrated and described in U.S. Patent 2,709,203. Thus the test wiper arm A of a dial selector represented symbolically in the drawing corresponds to the test wiper A in such patent. Similarly, the relay C with the windings I and II in the drawing corresponds to the busy relay C with windings $C_1$ and $C_2$ in said patent.

The illustrated test circuit comprises a relay choke DR which simulates the conditions provided by the seizure of private relay C in the test line, and a voltage measuring circuit connected over the resistor R1 which taps the voltage at the point J. These elements control the operation of the relays P and PH, the contacts p3 and ph1, ph2 of which disconnect the input E of the test circuit, after completion of the testing, from the test circuit (extending over point J) while connecting it to the seizure resistor R2.

All test circuits over which the same lines can be reached are over the points S1 and S2 connected together in such a manner, that the partial voltage potential (−25 v.), lying upon testing of a test circuit at the point Q, is over rectifiers (G12, G13, G14 . . .) extended to the blocking or busying points (S2, S3, S4 . . .) of all other test circuits.

The voltage measuring circuit operates as follows:

In normal or resting position of the circuit, the transistor T1 is at cutoff due to plus potential thereon, which is extended over the windings of the relay choke DR (which simulates the seizure or private relay C in the test circuit) and the resistor R1. The point K is therefore on minus potential, making the transistor T2 conductive, thus placing at the point L partial potential (−28 v.). The diode D is not yet conductive owing to the voltage lying between the points K and M, and partial potential (−20 v.) is therefore at the point M, keeping the transistor T3 at cutoff. Accordingly, partial potential (−23 v.) is at the point N which also keeps the transistor T4 at cutoff. Relay P is deenergized while relay PH is energized in a circuit over the break side of contact p1.

The circuit is so dimensioned that the transistor T1 becomes conductive, due to the partial voltage appearing at the point J, only responsive to connection of a single test circuit to an idle relay C with the winding II thereof short-circuited, while remaining at cutoff, in the presence of simultaneous connection of two test circuits to an idle relay C, or upon connection of a test circuit to a busied or to a releasing relay C the winding II of which is not yet short-circuited.

When a test circuit is connected to an idle test line, there will appear at the point J a partial voltage (−30 v.) whereby the transistor T1 is made conductive, and thus presents a low resistance as compared with R3. Consequently, there now appears at the point K a potential of −27 v., and as a result, transistor T2, which is conductive in the rest condition, is blocked, rectifier G3 thereby becoming free of current. Since the current formerly flowing over rectifier G3 is now absent, the blocking potential for the zener diode D is reached so that it becomes conductive. As a result of the current through the resistor 4, zener diode D and the resistor R5 there is evoked a partial potential of −25 v. at point M, the resistors R4 and R5 and the diode D being correspondingly dimensioned. Through this partial potential at point M, the transistor T3 becomes conductive, and a current thus flows over the circuit comprising resistors R6 and R7, and the transistor T3 resulting in a drop of 5 v. across R7, so that at point N there is established a potential of −28 v. Transistor T4 then becomes conductive and relay P is thereby operatively connected and energizes, placing itself in a holding circuit over the make side of contact $p2$ while the relay PH is disconnected. Contact $ph2$ connects the seizure or busying resistor R2, over contact $p3$ which had been closed by the energization of relay P, such resistor also assuming the blocking or busying function. The partial voltage lying on the point J is shifted by the closure of contact $ph2$ (even before opening of the contact $ph1$), causing the voltage measuring circuit to restore to resting position. The current circuits for the testing and the busying, extending over the point J, are disconnected at the contact $ph1$. Relays P and PH may also be referred to as auxiliary relays.

The described arrangement makes is possible to satisfy, also with the use of relays equipped with individual armatures, the requirement according to which the holding circuit for the relay P (which stores the testing result) is to be established before the voltage measuring circuit is disconnected, since such relays assure a switching sequence within their contacts (such for example as contacts $p1$, $p2$) although they do not assure a switching sequence among one another of their contacts.

Differently constructed test circuits may take the place of the described electronic test circuit, which require less expenditure, for example, when omitting the requirement for mutual blocking or busying.

Changes may be made within the scope and spirit of the appended claims which define what is believed to be new and desired to have protected by Letters Patent.

We claim:
1. A circuit arrangement for use in communication systems and especially telephone systems for the testing of the busy operating condition and for the blocking of test lines in which complex resistances are connected, comprising a test circuit, said test circuit provided with a voltage measuring device and means having a complex resistance, said complex resistance means being connectable to a line under test to form with the complex resistance of such line a voltage divider, operatively connecting said voltage measuring circuit means to the intermediate point of the voltage divider so formed for effecting the measurement of the voltage potential thereat, with said complex resistance means causing a voltage potential representing the test potential to remain constant during the current rise in the test line as a result of the complex resistance therein.

2. A circuit arrangement according to claim 1 wherein said complex resistance means is constructed to simulate the complex resistance in the line under test whereby said voltage measuring device is connected at the midpoint of said voltage divider, said measuring device having a relatively high resistance.

3. A circuit arrangement according to claim 2, wherein said voltage measuring device has an output for blocking other voltage measuring devices connectable with said test line.

4. A circuit arrangement according to claim 3, comprising an auxiliary relay, means for connecting one end of the winding of said auxiliary relay to the output of the voltage measuring circuit and to the open side of a make-break contact controlled thereby, whereby said auxiliary relay closes upon energization thereof a holding circuit for itself, a further auxiliary relay the winding of which is operatively connected with the normally closed side of contact controlled by the first named auxiliary relay, said further auxiliary relay having a make-break contact controlled thereby, operatively connected to the line to be tested, the make side of such contact being connected with the input of the test circuit and the break side thereof being connected with a further make contact controlled by said first named auxiliary relay which further make contact is connected with a resistor over which is conducted the seizure and the busying potential.

References Cited by the Examiner
UNITED STATES PATENTS
2,709,203  5/1955  Buchner _____ 179—18

ROBERT H. ROSE, *Primary Examiner.*